United States Patent
Li

(10) Patent No.: US 9,054,378 B2
(45) Date of Patent: Jun. 9, 2015

(54) POSITIVE PLATE MATERIAL AND CELL COMPRISING IT

(75) Inventor: Guohua Li, Kanagawa (JP)

(73) Assignee: SONY CORPORATION (JP)

( * ) Notice: Subject to any disclaimer, the term of this patent is extended or adjusted under 35 U.S.C. 154(b) by 559 days.

(21) Appl. No.: 10/466,014

(22) PCT Filed: Nov. 8, 2002

(86) PCT No.: PCT/JP02/11667
§ 371 (c)(1),
(2), (4) Date: Jul. 9, 2003

(87) PCT Pub. No.: WO03/041193
PCT Pub. Date: May 15, 2003

(65) Prior Publication Data
US 2004/0053133 A1    Mar. 18, 2004

(30) Foreign Application Priority Data
Nov. 9, 2001   (JP) ............................... P2001-344224

(51) Int. Cl.
*H01M 4/50* (2010.01)
*H01M 4/52* (2010.01)
*H01M 4/505* (2010.01)
(Continued)

(52) U.S. Cl.
CPC .............. *H01M 4/505* (2013.01); *H01M 4/131* (2013.01); *H01M 4/525* (2013.01); *H01M 10/052* (2013.01); *Y02E 60/122* (2013.01)

(58) Field of Classification Search
USPC ......................................... 429/223, 231, 219
See application file for complete search history.

(56) References Cited

U.S. PATENT DOCUMENTS 5,993,998 A * 11/1999 Yasuda .................... 429/231.95
6,207,325 B1   3/2001 Matsui et al.
(Continued)

FOREIGN PATENT DOCUMENTS

EP    0712172       5/1996
JP    05-242891     9/1993
(Continued)

OTHER PUBLICATIONS

IPDL JPO Machine Translation for JP 10-316431 A (publication date of Dec. 1998).*

(Continued)

*Primary Examiner* — Alix Eggerding
(74) *Attorney, Agent, or Firm* — Sheridan Ross P.C.

(57) ABSTRACT

Provided are a cathode material capable of achieving a higher discharge capacity and a higher discharge voltage, and obtaining superior charge-discharge characteristics, and a battery using the cathode material. A separator (15) is disposed between a cathode (12) and an anode (14). The cathode (12) comprises a lithium composite oxide represented by $Li_aMI_bMII_cO_d$. MI represents at least two kinds selected from the group consisting of Mn, Ni and Co, and MII represents at least one kind selected from the group consisting of Al, Ti, Mg and B. Further, a, b, c and d are within a range satisfying $1.0<a<1.5$, $0.9<b+c<1.1$, $a>b+c$, $1.8<d<2.5$, respectively. When lithium is excessively included, the charge capacity can be improved, and even after charge, a certain amount of lithium remains in the crystalline structure of the lithium composite oxide, so the stability of the crystalline structure can be improved.

5 Claims, 15 Drawing Sheets

(51) Int. Cl.
*H01M 4/131* (2010.01)
*H01M 4/525* (2010.01)
*H01M 10/052* (2010.01)

(56) References Cited

U.S. PATENT DOCUMENTS

| | | | |
|---|---|---|---|
| 6,352,794 B1 * | 3/2002 | Nakanishi et al. | 429/221 |
| 6,482,550 B1 * | 11/2002 | Imachi et al. | 429/338 |
| 6,517,974 B1 * | 2/2003 | Kobayashi et al. | 429/231.95 |
| 6,623,886 B2 * | 9/2003 | Yang et al. | 429/218.1 |
| 6,998,069 B1 * | 2/2006 | Coluccia et al. | 252/518.1 |
| 2002/0119374 A1 * | 8/2002 | Yang et al. | 429/231.1 |
| 2002/0150530 A1 * | 10/2002 | Gao et al. | 423/593 |
| 2003/0054250 A1 * | 3/2003 | Kweon et al. | 429/231.1 |

FOREIGN PATENT DOCUMENTS

| | | | | |
|---|---|---|---|---|
| JP | 08-78006 | | 3/1996 | |
| JP | 08-78007 | | 3/1996 | |
| JP | 08-78009 | | 3/1996 | |
| JP | 08-315819 | | 11/1996 | |
| JP | 09-237624 | | 9/1997 | |
| JP | 10-241691 | | 9/1998 | |
| JP | 10-294100 | | 11/1998 | |
| JP | 10-316431 | * | 12/1998 | C01G 51/00 |
| JP | 11-16571 | | 1/1999 | |
| JP | 11-307094 | * | 5/1999 | |
| JP | 11-307094 A | * | 11/1999 | |
| JP | 2000-149923 | * | 5/2000 | H01M 4/02 |
| JP | 2000-149923 A | * | 5/2000 | |
| JP | 2000-315502 | | 11/2000 | |
| JP | 2000-323143 | | 11/2000 | |
| JP | 2000-340229 | | 12/2000 | |
| JP | 2000-340230 | | 12/2000 | |
| JP | 2000-348724 | | 12/2000 | |
| JP | 2001-135314 | | 5/2001 | |
| JP | 2002-124257 | | 4/2002 | |
| JP | 2002-124621 | | 4/2002 | |
| JP | 2002-222648 | | 8/2002 | |
| WO | 00/52773 | | 9/2000 | |
| WO | WO01/41238 | * | 6/2001 | |

OTHER PUBLICATIONS

IPDL JPO Machine Translation for JP 2000-149923 A (publication date of May 2000).*
IPDL JPO Machine Translation for JP 11-307094 A (publication date of Nov. 1999).*
IPDL JPO Machine Translation for 2000-149923 (publication date May 2000).*
IPDL JPO Machine Translation for 10-316431 (publication date Dec. 1998).*
A European Search Report in counterpart EP Application No. 02780051.5-1227 dated Feb. 27, 2009.

* cited by examiner

POSITIVE PLATE MATERIAL AND CELL COMPRISING IT

BACKGROUND OF THE INVENTION

The present invention relates to a cathode material comprising a lithium composite oxide including lithium (Li), a first element including at least two kinds selected from the group consisting of manganese (Mn), nickel (Ni) and cobalt (Co), and a second element including at least one kind selected from the group consisting of aluminum (Al), titanium (Ti), magnesium (Mg) and boron (B), and a battery using the same.

In recent years, with advances in electronic technologies, higher performance, downsizing and portability of electronic devices have dramatically progressed. Accordingly, studies of rechargeable secondary batteries as power sources which can be conveniently and economically used for a long time have been progressing. As the secondary batteries, lead-acid batteries, alkaline batteries, lithium-ion secondary batteries and so on are conventionally and widely known. Among them, attention has been given to the lithium-ion secondary batteries as batteries in which higher power and higher energy density can be achieved.

In the lithium-ion secondary battery, as a cathode material, for example, a metal oxide, a metal sulfide or a polymer is used. More specifically, a compound not including lithium such as $TiS_2$, $MoS_2$, $NbSe_2$, $V_2O_5$ or the like, or a lithium composite oxide including lithium such as $LiCoO_2$, $LiNiO_2$, $LiMnO_2$, $LiMn_2O_4$ or the like is known.

Among them, $LiCoO_2$ is widely applied to practical use as a cathode material having a potential of approximately 4 V relative to a lithium metal potential, and is an ideal cathode material in various aspects because $LiCoO_2$ has a higher energy density and a higher voltage. However, Co (cobalt) as a resource is unevenly distributed and scarce, so there is a problem that it is difficult to stably supply Co, thereby a material cost becomes higher.

Therefore, instead of $LiCoO_2$, a lithium composite oxide including abundant and low-cost nickel (Ni) or manganese (Mn) as a base holds promise.

However, $LiNiO_2$ has a large theoretical capacity and a high discharge potential, but its crystalline structure collapses in accordance with the progress of a charge-discharge cycle, thereby resulting in a decline in a discharge capacity and lower thermostability.

Moreover, $LiMn_2O_4$ with a normal spinel structure and a space group $Fd\overline{3}m$ has as high a potential as $LiCoO_2$, and can obtain a high battery capacity. Further, $LiMn_2O_4$ can be easily synthesized. However, there is a problem such as insufficient stability or insufficient cycle characteristics, that is, degradation in capacity is large during storage at high temperature, and Mn is dissolved in an electrolyte solution.

Moreover, $LiMnO_2$ with a layer structure can obtain a higher capacity than $LiMn_2O_4$, however, it is difficult to synthesize $LiMnO_2$, and there is a problem that when a charge-discharge cycle is repeated, the structure becomes unstable, and the capacity declines.

In view of the foregoing, it is an object of the present invention to provide a cathode material capable of achieving a higher discharge capacity and a higher discharge voltage and obtaining superior charge-discharge characteristics, and a battery using the cathode material.

SUMMARY OF THE INVENTION

A cathode material according to the invention comprises a lithium composite oxide including lithium, a first element including at least two kinds selected from the group consisting of manganese, nickel and cobalt, and a second element including at least one kind selected from the group consisting of aluminum, titanium, magnesium and boron, wherein a composition ratio of lithium to the total of the first element and the second element (lithium/the total of the first element and the second element) is larger than 1 in molar ratio.

A battery according to the invention comprises a cathode; an anode; and an electrolyte, wherein the cathode comprises a lithium composite oxide including lithium, a first element including at least two kinds selected from the group consisting of manganese, nickel and cobalt, and a second element including at least one kind selected from the group consisting of aluminum, titanium, magnesium and boron, and a composition ratio of the lithium to the total of the first element and the second element (lithium/the total of the first element and the second element) is larger than 1 in molar ratio.

In the cathode material according to the invention, a composition ratio of lithium to the total of the first element and the second element (lithium/the total of the first element and the second element) is larger than 1 in molar ratio, so a higher electric capacity can be obtained during charge, and after charge, a certain amount of lithium remains in a crystalline structure of the lithium composite oxide, so the stability of the crystalline structure can be maintained.

In the battery according to the invention, the cathode material according to the invention is used, so a higher discharge capacity and superior charge-discharge characteristics can be obtained.

DETAILED DESCRIPTION OF THE PRESENTLY PREFERRED EMBODIMENTS

Figure 1:
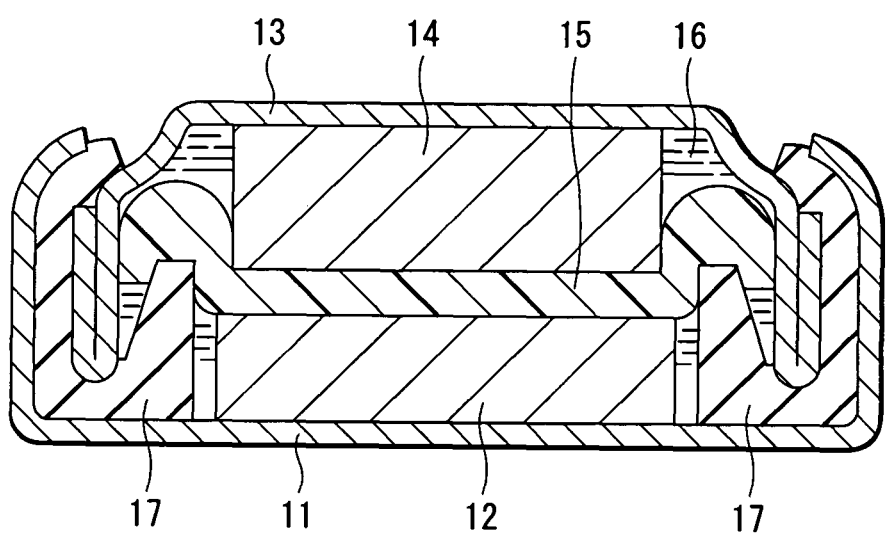
FIG. 1 is a sectional view of a secondary battery using a cathode material according to an embodiment of the invention.

Preferred embodiments of the present invention will be described in more detail below referring to the accompanying drawings.

A cathode material according to an embodiment of the invention comprises a lithium composite oxide including lithium, a first element including at least two kinds selected from the group consisting of manganese, nickel and cobalt, and a second element including at least one kind selected from the group consisting of aluminum, titanium, magnesium and boron. The lithium composite oxide has, for example, a layer structure.

The first element functions as a redox center, and includes at least two kinds selected from the group consisting of manganese, nickel and cobalt, thereby a higher capacity and a higher potential can be achieved. More specifically, it is preferable to include manganese as the first element, because a higher capacity and a higher potential can be achieved at lower cost. Moreover, it is preferable to further include cobalt as the first element, because the capacity can be further increased. The second element is provided for stabilizing a crystalline structure of the lithium composite oxide, and the second element is substituted for the first element in a part of the site of the first element.

A chemical formula of the lithium composite oxide is represented by, for example, Chemical Formula 1.

   (Chemical Formula 1)

In the chemical formula, MI and MII represent the first element and the second element, respectively, and it is preferable that a, b, c, and d are within a range satisfying $1.0<a<1.5$, $0.9<b+c<1.1$, $1.8<d<2.5$, respectively.

The composition a of lithium in Chemical Formula 1 can be selected within a range from 1 to 2, however, when the composition a is larger than 1, a higher capacity can be obtained, and on the other hand, when it is 1.5 or larger, the crystalline structure changes, thereby resulting in a decline in the capacity. Therefore, the composition a is more preferably within a range of $1.1<a<1.5$.

Moreover, the total composition b+c of the first element and the second element and the composition d of oxygen in Chemical Formula 1 are not limited to the range. However, when the composition b+c and the composition d are out of the range, it is difficult to form a compound having a single phase layer structure, and the crystalline structure becomes unstable, thereby resulting in a decline in battery characteristics.

The lithium composite oxide excessively includes lithium, so a composition ratio of lithium to the total of the first element and the second element (lithium/the total of the first element and the second element) is larger than 1 in molar ratio. For example, in the chemical formula shown in Chemical Formula 1, a, b and c have a relationship of a>b+c. As lithium is excessively included, a higher electric capacity can be obtained during charge, and after charge, a certain amount of lithium remains in the crystalline structure of the lithium composite oxide, thereby the stability of the crystalline structure can be maintained.

The composition ratio of lithium to the total of the first element and the second element (lithium/the total of the first element and the second element) is preferably larger than 1 and smaller than 1.5 in molar ratio, and more preferably larger than 1.1 and smaller than 1.5. For example, in the chemical formula shown in Chemical Formula 1, a, b and c is preferably within a range of $1<a/(b+c)<1.5$, and more preferably within a range of $1.1<a/(b+c)<1.5$, because a higher capacity can be obtained within the range.

The cathode material with such a structure can be formed through various methods. For example, the cathode material can be formed through mixing and firing some materials such as lithium hydroxide (LiOH), manganese sesquioxide ($Mn_2O_3$), nickel hydroxide ($Ni(OH)_2$), cobalt hydroxide ($Co(OH)_2$), aluminum nitrate ($Al(NO_3)_3 \cdot 9H_2O$), titanium dioxide ($TiO_2$), magnesium oxalate ($MgC_2O_4 \cdot 2H_2O$), boron trioxide ($B_2O_3$) or the like as necessary. More specifically, after these materials are mixed in a predetermined ratio, and are mixed and pulverized by a ball mill with using ethanol as a dispersing medium, the materials are fired in air or in an oxygen atmosphere. In addition to the above-described materials, various kinds of carbonates, nitrates, oxalates, phosphates, oxides, or hydroxides can be used.

The cathode material formed through such a method is used for a cathode of the following secondary battery.

FIG. 1 shows a sectional view of the secondary battery using the cathode material according to the embodiment. The secondary battery is a so-called coin type secondary battery, and comprises a disk-shaped cathode 12 contained in an outer can 11 and a disk-shaped anode 14 contained in an outer cap 13 which are laminated with a separator 15 in between. Interiors of the outer can 11 and the outer cap 13 are filled with an electrolyte solution 16 which is a liquid electrolyte, and peripheral portions of the outer can 11 and the outer cap 13 are sealed through caulking by an insulating gasket 17.

The outer can 11 and the outer cap 13 are made of, for example, metal such as stainless, aluminum or the like. The outer can 11 functions as a collector of the cathode 13, and the outer cap 13 functions as a collector of the anode 14.

The cathode 12 includes, for example, the cathode material according to the embodiment as a cathode active material together with a conductor such as carbon black, graphite or the like and a binder such as polyvinylidene fluoride or the like. In other words, the cathode 12 includes the above-described lithium composite oxide. For example, after the cathode material, the conductor and the binder are mixed so as to prepare a cathode mixture, the cathode mixture is compression molded in a pellet shape so as to form the cathode 12. Alternatively, in addition to the cathode material, the conductor and the binder, a solvent such as N-methyl-2-pyrrolidone or the like may be added and mixed so as to prepare a cathode mixture, and after the cathode mixture is dried, the cathode mixture may be compression molded to form the cathode 12. In this case, the cathode material may be used in an as-is state or in a dried state, however, when the cathode material contacts with water, the material reacts, thereby functions as the cathode material are impaired, so it is preferable to fully dry the cathode material.

The anode 14 includes, for example, one kind or two or more kinds selected from the group consisting of lithium metal, a lithium alloy and a material capable of inserting and extracting lithium. As the material capable of inserting and extracting lithium, for example, a carbonaceous material, a metal compound, silicon, a silicon compound or an electrically conductive polymer is cited, and one kind or a mixture of two or more kinds selected from them is used. As the carbonaceous material, graphite, non-graphitizable carbon, graphitizing carbon or the like is cited, and as the metal compound, an oxide such as $SnSiO_3$, $SnO_2$ or the like is cited. Further, as the electrically conductive polymer, polyacetylene, polypyrrole or the like is cited. Among them, the carbonaceous material is preferable, because a very small change in the crystalline structure occurs during charge and discharge, so a higher charge-discharge capacity and superior cycle characteristics can be obtained.

In addition, when the anode 14 includes the material capable of inserting and extracting lithium, the anode 14 includes the material together with, for example, a binder such as polyvinylidene fluoride or the like. In this case, after, for example, the material capable of inserting and extracting lithium and the binder are mixed with each other so as to prepare an anode mixture, the obtained anode mixture is compression molded in a pellet shape so as to form the anode 14. Further, in addition to the material capable of inserting and extracting lithium and the binder, a solvent such as N-methyl-2-pyrrolidone or the like may be added and mixed so as to prepare an anode mixture, and after the anode mixture is dried, the anode mixture may be compression molded so as to form the anode 14.

The separator 15 isolates the cathode 12 from the anode 14 to prevent a short circuit of current due to a contact between the cathode 12 and the anode 14, and passes lithium ions through. The separator 15 is made of, for example, a porous film made of a synthetic resin such as polytetrafluoroethylene, polypropylene, polyethylene or the like, or a porous film made of an inorganic material such as a ceramic nonwoven fabric or the like. The separator 15 may have a structure in which two or more kinds selected from the porous films are laminated.

The electrolyte solution 16 is formed through dissolving lithium salt as an electrolyte salt in a solvent, and exhibits ionic conductivity by ionizing the lithium salt. As the lithium salt, $LiPF_6$, $LiClO_4$, $LiAsF_6$, $LiBF_4$, $LiCF_3SO_3$, $LiN(CF_3SO_2)_2$, or the like is suitable, and one kind or a mixture of two or more kinds selected from them is used.

As the solvent, a nonaqueous solvent such as propylene carbonate, ethylene carbonate, butylene carbonate, vinylene carbonate, γ-butyrolactone, sulfolane, 1,2-dimethoxyethane, 1,2-diethoxyethane, 2-methyltetrahydrofuran, 3-methyl-1,3-dioxolane, methyl propionate, methyl butyrate, dimethyl carbonate, diethyl carbonate, dipropyl carbonate or the like is preferable, and one kind or a mixture of two or more kinds selected from them is used.

The secondary battery acts as follows.

When the secondary battery is charged, for example, lithium ions are extracted from the cathode 12 and inserted into the anode 14 through the electrolyte solution 16. When the secondary battery is discharged, for example, lithium ions are extracted from the anode 14, and inserted into the cathode 12 through the electrolyte solution 16. In this case, the cathode 12 comprises a lithium composite oxide including at least two kinds selected from the group consisting of manganese, nickel and cobalt as the first element, so a higher discharge capacity and a higher discharge potential can be obtained. Moreover, the lithium composite oxide includes the second element, so the crystalline structure thereof is stable, and a decline in the discharge capacity due to the charge-discharge cycles is reduced. Further, the lithium composite oxide includes an excessive amount of lithium, so the charge capacity can be improved, and a higher discharge capacity can be obtained, and even after charge, a certain amount of lithium remains in the cathode 12, so the stability of the crystalline structure of the lithium composite oxide can be further improved, and superior charge-discharge cycle characteristics can be obtained.

Thus, the cathode material according to the embodiment comprises the lithium composite oxide including at least two kinds selected from the group consisting of manganese, nickel and cobalt as the first element, so a higher capacity, a higher potential and higher cost efficiency can be obtained. Moreover, the lithium composite oxide includes the second element, so the crystalline structure thereof can be stabilized, and the charge-discharge cycle characteristics can be improved. Further, a composition ratio of lithium to the total of the first element and the second element (lithium/the total of the first element and the second element) in the lithium composite oxide is larger than 1 in molar ratio, so the battery capacity during charge can be further improved, and a certain amount of lithium remains in the crystalline structure even after charge, thereby the stability of the crystalline structure can be further improved.

Therefore, when the cathode material is used, an economically superior secondary battery with a higher discharge capacity, a higher discharge potential and superior charge-discharge cycle characteristics can be obtained.

More specifically, when manganese is included as the first element, a higher capacity and a higher potential can be achieved at lower cost, and when cobalt is further included as the first element, the capacity can be further increased.

Moreover, as shown in Chemical Formula 1, the composition of the lithium composite oxide is within a range of $1.0<a<1.5$, $0.9<b+c<1.1$, $1.8<d<2.5$, the capacity can be further improved.

Next, specific examples of the invention will be described in detail below.

Examples 1 through 4

Firstly, lithium hydroxide monohydrate ($LiOH \cdot H_2O$), manganese sesquioxide, nickel hydroxide, cobalt hydroxide and aluminum nitrate were sufficiently mixed and pulverized by a ball mill with using ethanol as a dispersion medium. At that time, a molar ratio of the materials was varied in Examples 1 through 5 as shown in Table 1. Next, the obtained mixture was fired for 12 hours at a temperature ranging from 600° C. to 900° C. in air to synthesize a lithium composite oxide $Li_aMI_bMII_cO_2$ with a composition shown in Table 2, more specifically $Li_aMn_{0.5}Ni_{0.2}Co_{0.2}Al_{0.1}O_2$.

The powder X-ray diffraction patterns of the obtained lithium composite oxides in Examples 1 through 4 were measured by using a rotating anode type X-ray diffractometer Rigaku-RINT2500. The X-ray diffractometer comprised an upright goniometer with a radius of 185 mm. In the X-ray diffractometer, X-rays were converted into monochrome by a combination of a multichannel analyzer and a counter monochromator without using a filter such as a Kβ filter, and a specific X-ray was detected by a scintillation counter. The measurement was carried out by using CuKα (40 KV, 100 mA) as the specific X-ray. Assuming that both of an incident angle DS with a sample surface and an angle RS of a diffraction line with the sample surface were 1°, and a width SS of an entrance slit was 0.15 mm, the measurement was carried out by a reflection method through continuous scanning (scanning range 2θ=from 10° to 90°, scanning speed 4°/min).

Figure 2:
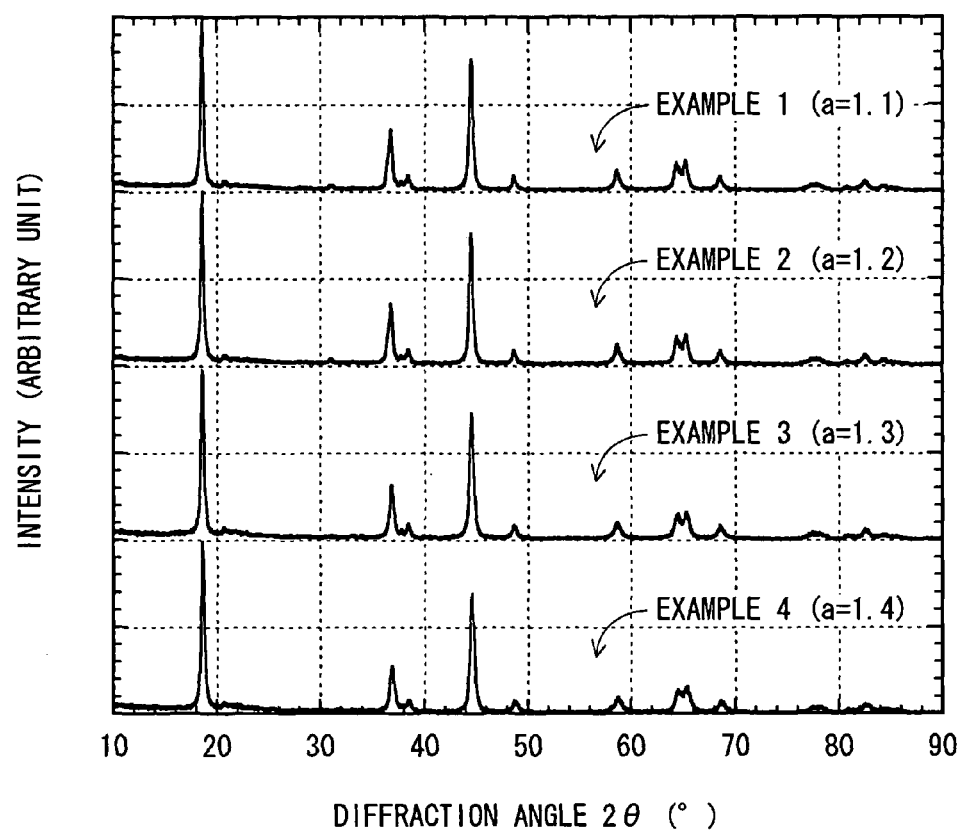
FIG. 2 is a plot showing X-ray diffraction patterns of cathode materials in Examples 1 through 4 of the invention.
Figure 3:
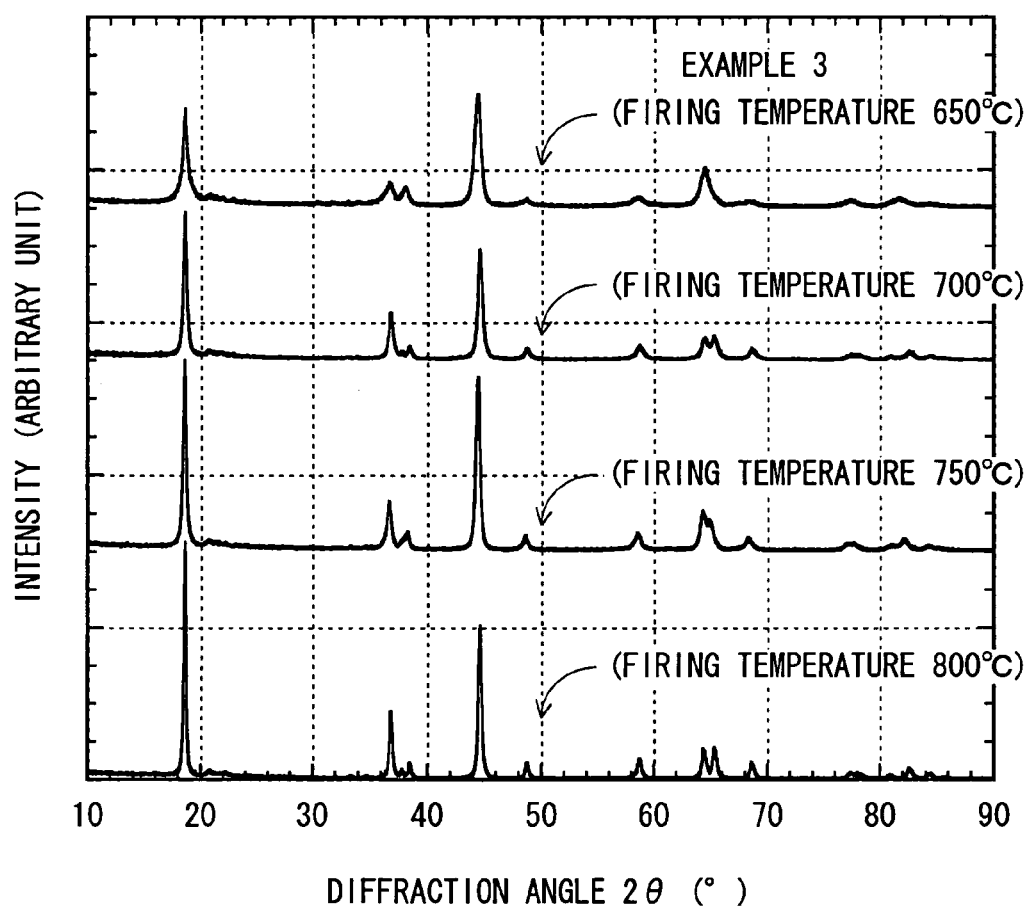
FIG. 3 is a plot showing X-ray diffraction patterns of the cathode material in Example 3 of the invention.

As a result, it was found out that each of the obtained lithium composite oxides in Examples 1 through 4 had a layer structure. FIG. 2 shows diffraction patterns in Examples 1 through 4 in the case where the firing temperature was 700° C. as a representative. Moreover, FIG. 3 shows the diffraction patterns in Example 3 in cases where the firing temperature was 650° C., 700° C., 750° C. and 800° C. In Example 1, peaks indicating impurities were slightly observed at 21° and from 33° to 34°, however, in Examples 2 through 4, the peaks were hardly observed.

Moreover, the coin type battery shown in FIG. 1 was made by using each of the lithium composite oxides in Examples 1 through 4, and the charge-discharge characteristics of each battery were examined to evaluate the properties of the cathode material.

The cathode 12 of the battery was formed through the following steps. Firstly, the synthesized lithium composite oxide $Li_aMI_bMII_cO_2$ was dried, and 60 mg of the lithium composite oxide as the cathode material was kneaded with graphite as a conductor, and polyvinylidene fluoride (Aldrich #1300) as a binder by using N-methyl-2-pyrrolidone as a solvent to form a paste-form cathode mixture. A ratio of the cathode material, graphite and polyvinylidene fluoride was 85 wt % of the cathode material, 10 wt % of graphite and 5 wt % of polyvinylidene fluoride. Next, the cathode mixture was palletized together with a mesh collector made of aluminum, and was dried at 100° C. for 1 hour in a dry argon (Ar) airflow to form the cathode 12.

A lithium metal plate stamped into a disk shape was used as the anode 14, and a porous film made of polypropylene was used as the separator 15, and a mixed solvent of ethylene carbonate and dimethyl carbobate in a volume ratio of 1:1 in which $LiPF_6$ was dissolved as lithium salt in a concentration of 1 mol/l was used as the electrolyte solution 16. The battery has a diameter of 20 mm and a height of 1.6 mm.

Moreover, a charge-discharge cycle was performed as follows. At first, after a constant current charge was performed until the battery voltage reached 4.5 V at a constant current, a constant voltage charge was performed until the current became 0.05 mA/cm$^2$ or less at a constant voltage of 4.5 V. Next, a constant current discharge was performed until the battery voltage reached 2.5 V at a constant current. At that time, the charge-discharge cycle was performed at room temperature (23° C.).

Figure 4:
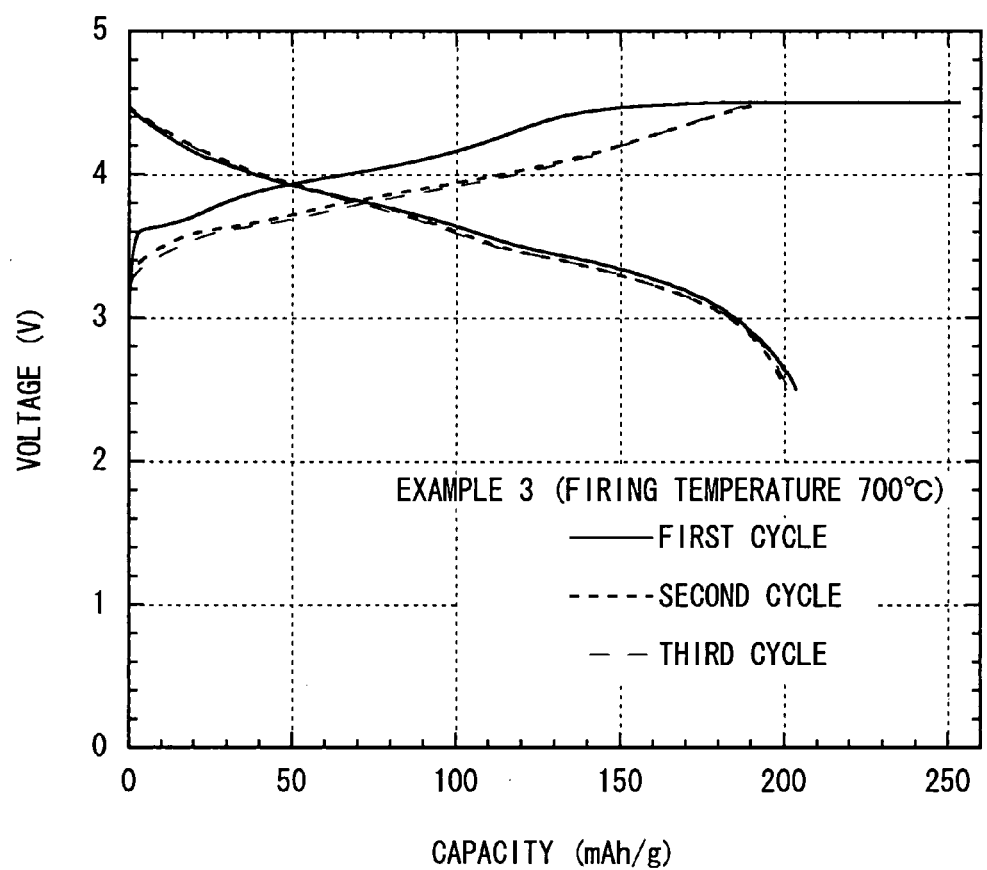
FIG. 4 is a plot showing charge-discharge curves in Example 3 of the invention.

FIG. 4 shows a charge-discharge curve in Example 3 in the case where the firing temperature was 700° C., and Table 3 shows a charge capacity and a discharge capacity in the first cycle in that case. In FIG. 4, a solid line, a short dashed line and a long dashed line indicate cycle charge-discharge curves in the first cycle, the second cycle and the third cycle, respectively.

Figure 5:
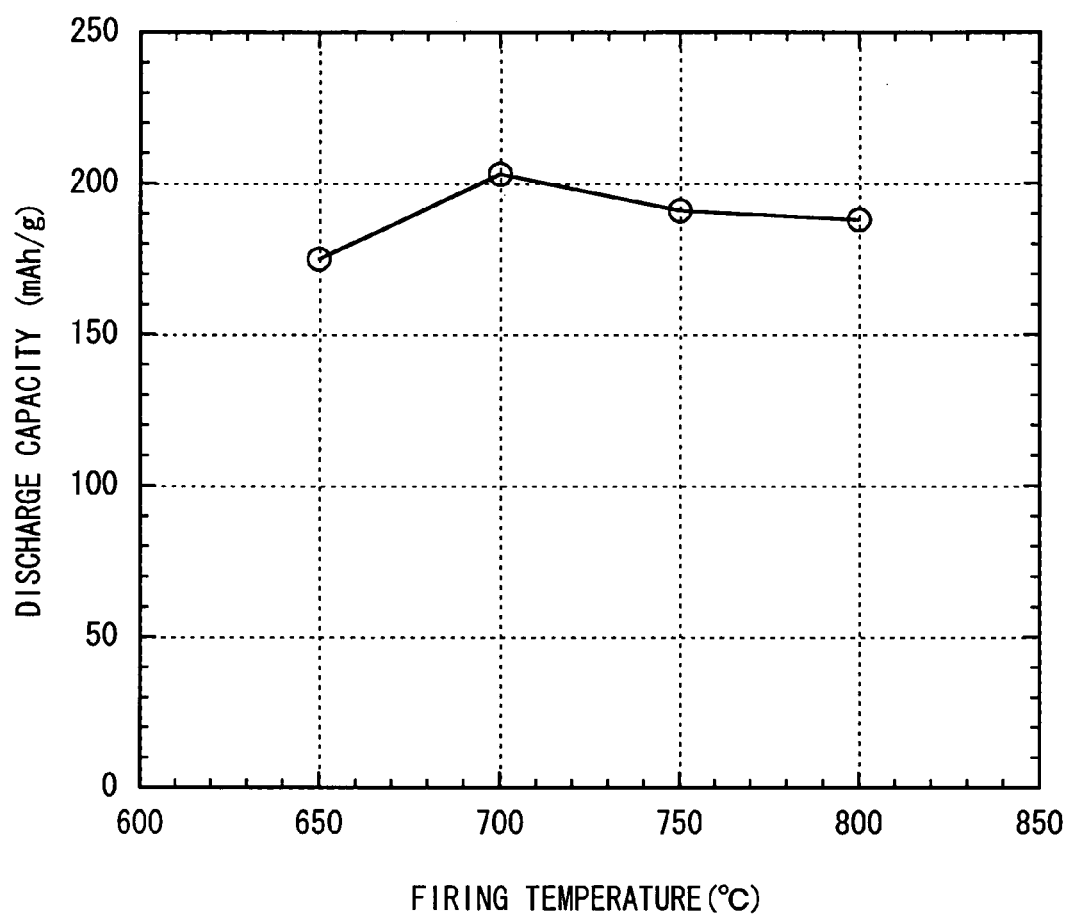
FIG. 5 is a plot showing a relationship between a firing temperature and a discharge capacity in Example 3 of the invention.
Figure 6:
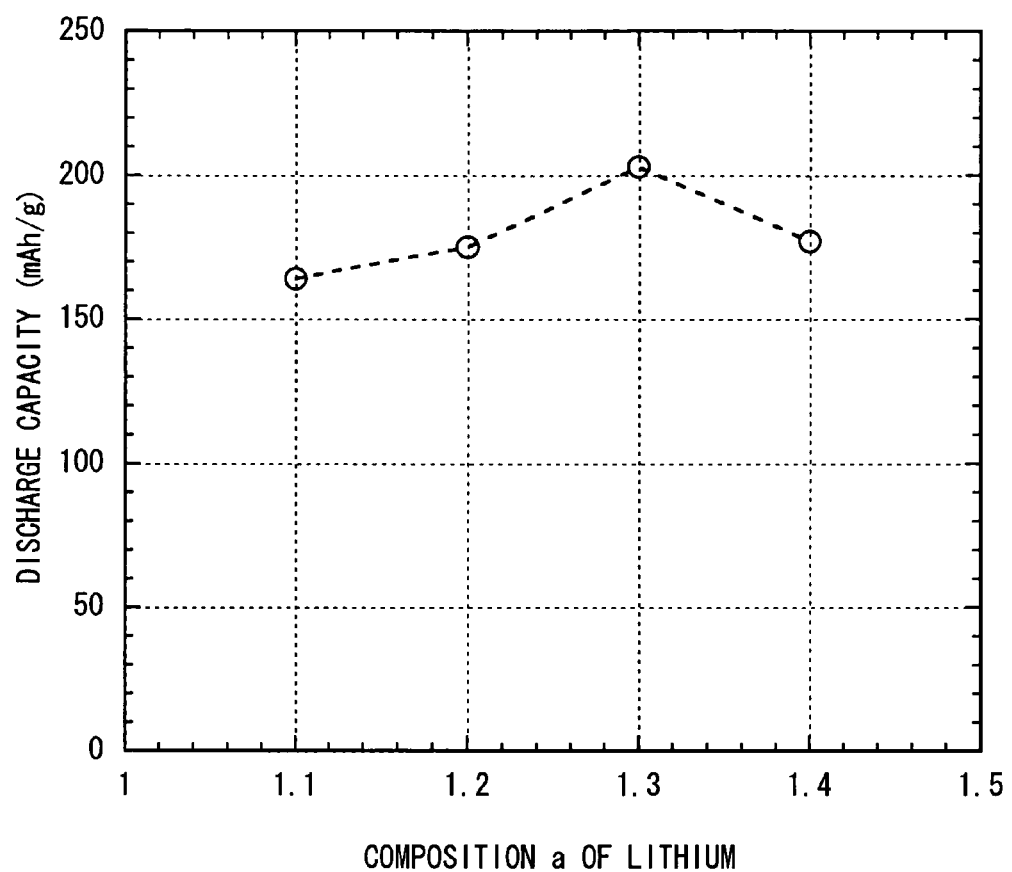
FIG. 6 is a plot showing a relationship between the composition of lithium and a discharge capacity in Examples 1 through 4 of the invention.
Figure 7:
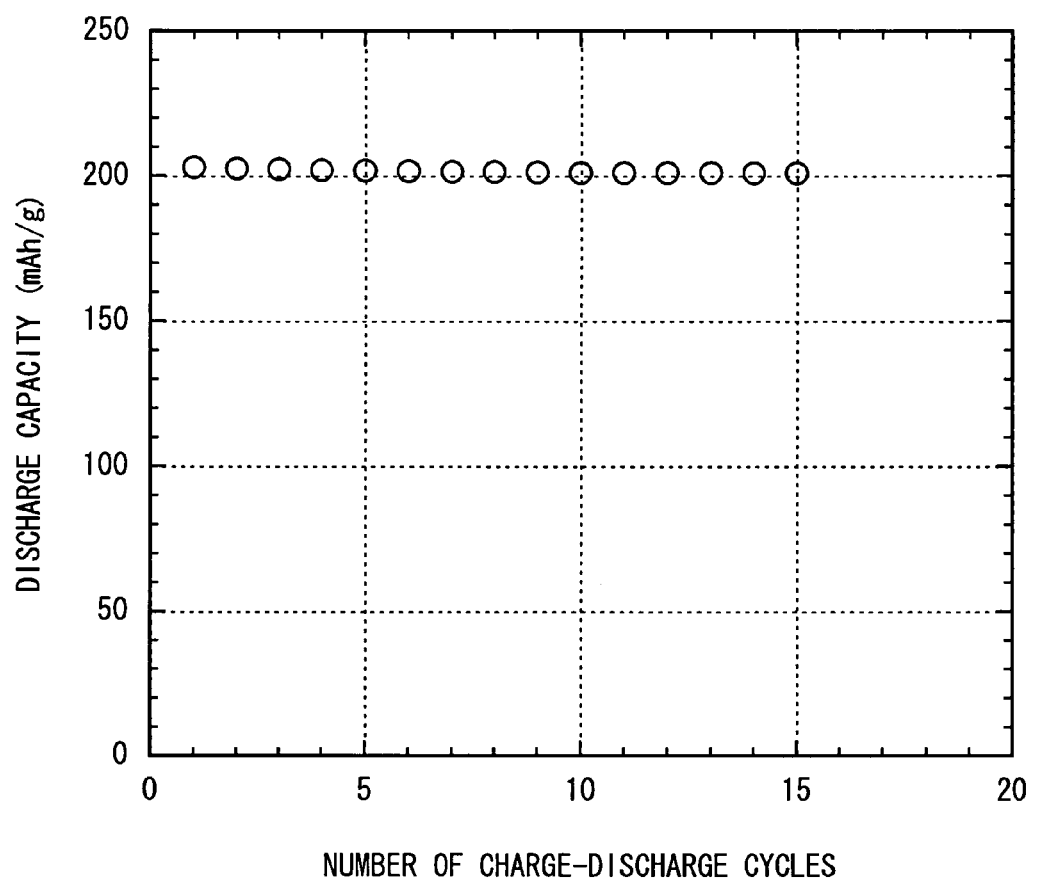
FIG. 7 is a plot showing a relationship between the number of charge-discharge cycles and a discharge capacity in Example 3 of the invention.

Further, FIG. 5 shows a relationship between the firing temperature and the discharge capacity in the first cycle in Example 3, and FIG. 6 shows a relationship between the composition a of lithium and the discharge capacity in the first cycle in Examples 1 through 4 in the case where the firing temperature was 700° C., and FIG. 7 shows a relationship between the number of charge-discharge cycles and the discharge capacity in Example 3 in the case where the firing temperature was 700° C.

As Comparative Examples 1 and 2 relative to Examples 1 through 4, lithium composite oxides $Li_aMI_bMII_cO_2$ having a composition shown in Table 2, more specifically, $LiMn_{0.5}Ni_{0.2}Co_{0.2}Al_{0.1}O_2$ or $LiNi_{0.8}Co_{0.2}O_2$ were synthesized as in the case of Examples 1 through 4, except that a molar ratio of materials was changed as shown in Table 1. Comparative Example 1 had the same composition as Examples 1 through 4, except that the composition a of lithium was 1.0, and the composition ratio a/(b+c) of lithium to the total of the first element and the second element was 1. In Comparative Example 2, the composition a of lithium was 1.0, the composition ratio a/(b+c) of lithium to the total of the first element and the second element was 1, and manganese which was the first element and the second element were not included.

Figure 8:
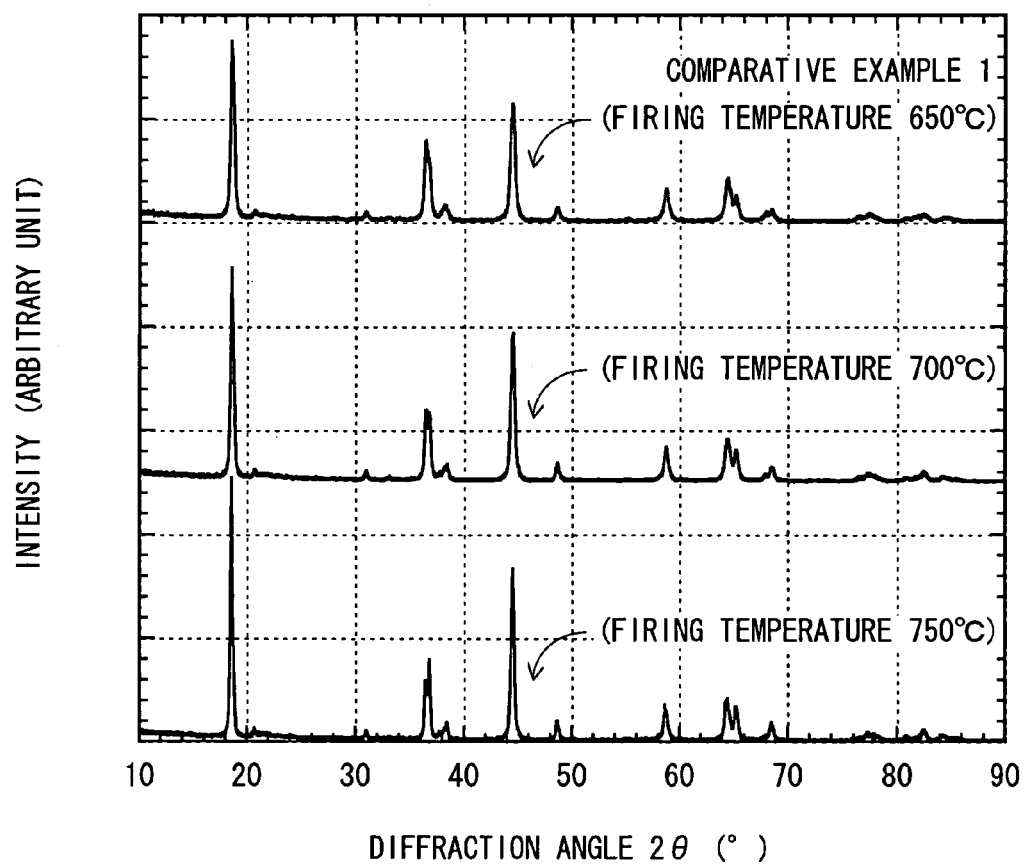
FIG. 8 is a plot showing X-ray diffraction patterns of a cathode material in Comparative Example 1.
Figure 9:
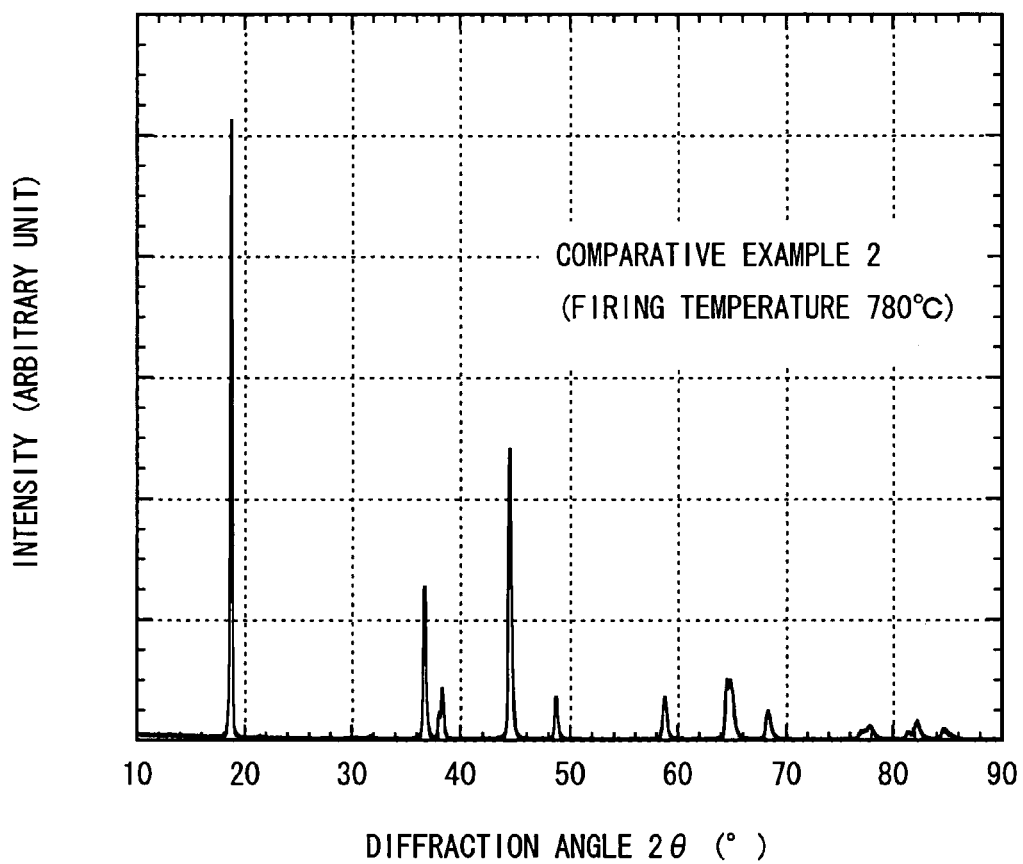
FIG. 9 is a plot showing an X-ray diffraction pattern of a cathode material in Comparative Example 2.

The powder X-ray diffraction patterns of the lithium composite oxides in Comparative Examples 1 and 2 were measured as in the case of Examples 1 through 4. As a result, it was found out that the lithium composite oxides in Comparative Examples 1 and 2 also had a layer structure. FIG. 8 shows diffraction patterns in Comparative Example 1 in cases where the firing temperature was 650° C., 700° C. and 750° C., and FIG. 9 shows a diffraction pattern in Comparative Example 2 in the case where the firing temperature was 780° C. In Comparative Example 1, as in the case of Example 1, peaks indicating impurities were observed.

Figure 10:
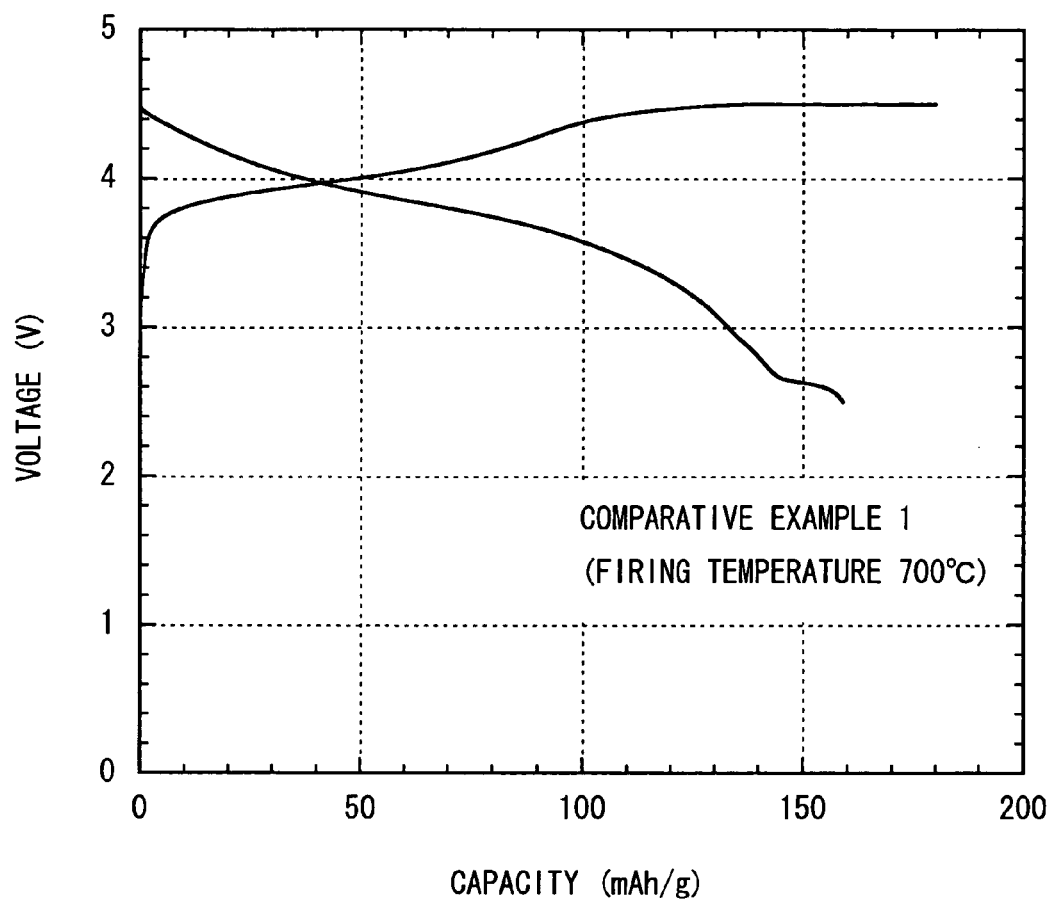
FIG. 10 is a plot showing charge-discharge curves in Comparative Example 1.
Figure 11:
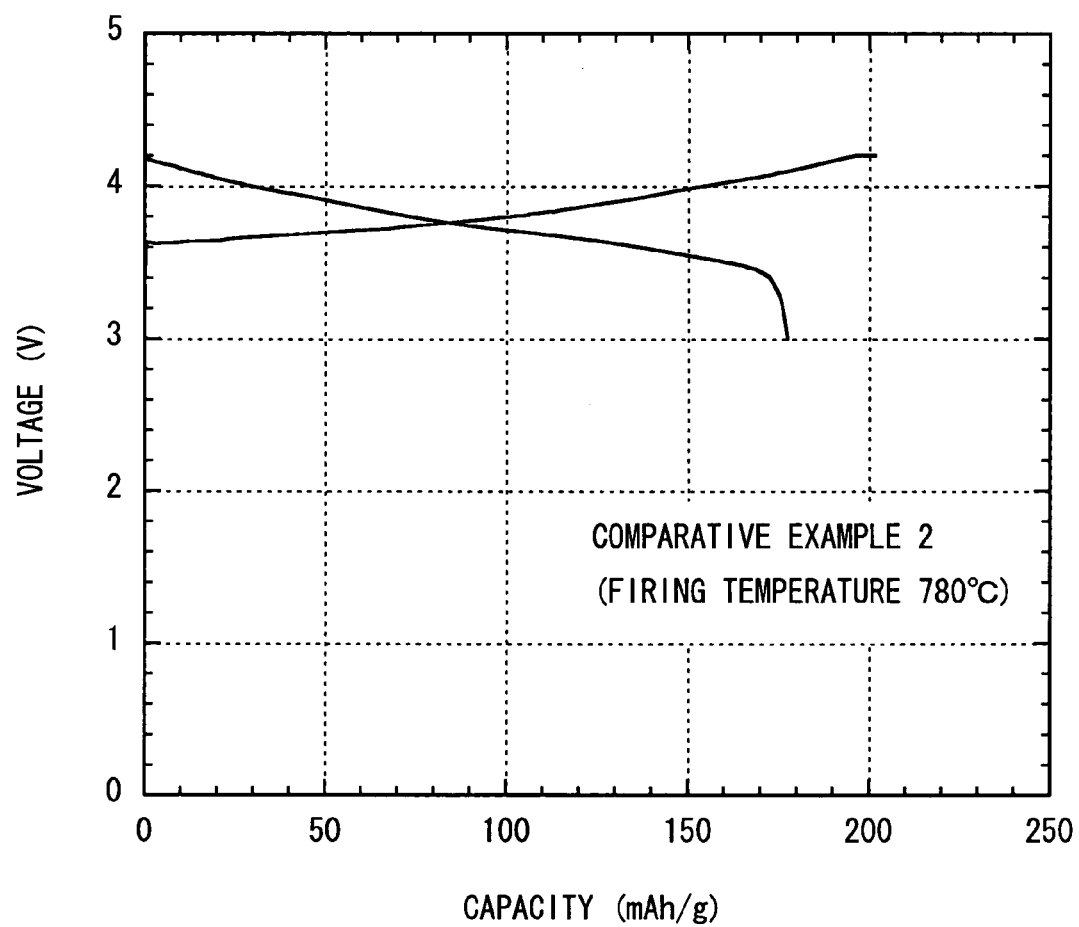
FIG. 11 is a plot showing charge-discharge curves in Comparative Example 2.

Moreover, the coin type battery was made by using each of the lithium composite oxides in Comparative Examples 1 and 2 as in the case of Examples 1 through 4, and the properties of the cathode material was evaluated in the same manner. FIG. 10 shows a charge-discharge curve in Comparative Example 1 in the case where the firing temperature was 700° C. as a representative, and FIG. 11 shows a charge-discharge curve in Comparative Example 2 in the case where the firing temperature was 780° C. as a representative. Table 3 shows the charge capacity and the discharge capacity in the first cycle in those cases. FIGS. 10 and 11 show the charge-discharge curves in the first cycle.

As shown in FIGS. 4, 10 and 11 and Table 3, Example 3, in which the composition ratio a/(b+c) of lithium to the total of the first element and second element was 1.3, could obtain a higher charge capacity and a higher discharge capacity than Comparative Examples 1 and 2, in which the composition ratio a/(b+c) was 1.0. In other words, it was found out that when the composition ratio a/(b+c) of lithium to the total of the first element and the second element was larger than 1.0, the charge capacity and the discharge capacity could be increased. Further, in Comparative Example 1, a voltage in the late stages of discharge was low. It was considered that it was because a change in the crystalline structure occurred. In other words, it was considered that when the composition ratio a/(b+c) of lithium to the total of the first element and the second element was larger than 1.0, the stability of the crystalline structure could be improved.

As shown in FIG. 5, when the firing temperature was 700° C., a higher discharge capacity was obtained.

As shown in FIG. 6, there was a tendency that when the composition a of lithium became larger, the discharge capacity became higher, and the discharge capacity reached the maximum value when the composition a was in the neighborhood of 1.3, then the capacity became lower. In other words, it was found out that when the composition a of lithium was within a range of 1.0<a<1.5, more specifically within a range of 1.1<a<1.5, or when the composition ratio a/(b+c) of lithium to the total of the first element and the second element was within a range of 1.0<a/(b+c)<1.5, more specifically within a range of 1.1<a/(b+c)<1.5, a higher discharge capacity could be obtained.

Further, as shown in FIG. 7, in Example 3, even though the charge-discharge cycle was repeated, little degradation in the discharge capacity was observed. In other words, it was found out that when the composition a/(b+c) of lithium to the total of the first element and the second element was larger than 1.0, superior charge-discharge cycle characteristics could be obtained.

In addition, as shown in FIGS. 4 and 11, Example 3 which included manganese as the first element could obtain a higher battery voltage than Comparative Example 2 which included no manganese. In other words, it was found out that when manganese was included as the first element, a higher discharge voltage could be obtained.

After lithium hydroxide monohydrate, manganese sesquioxide and chromium nitrate $(Cr(NO_3)_3 \cdot 9H_2O)$ were prepared in a molar ratio shown in Table 4, and were sufficiently mixed and pulverized by a ball mill with using ethanol as a dispersion medium, the mixture was fired at 1000° C. for 12 hours in air to synthesize a lithium composite oxide $LiMn_{0.9}Cr_{0.1}O_2$ including chromium (Cr) as the second element as Comparative Example 3 relative to Examples 1 through 4.

Figure 12:
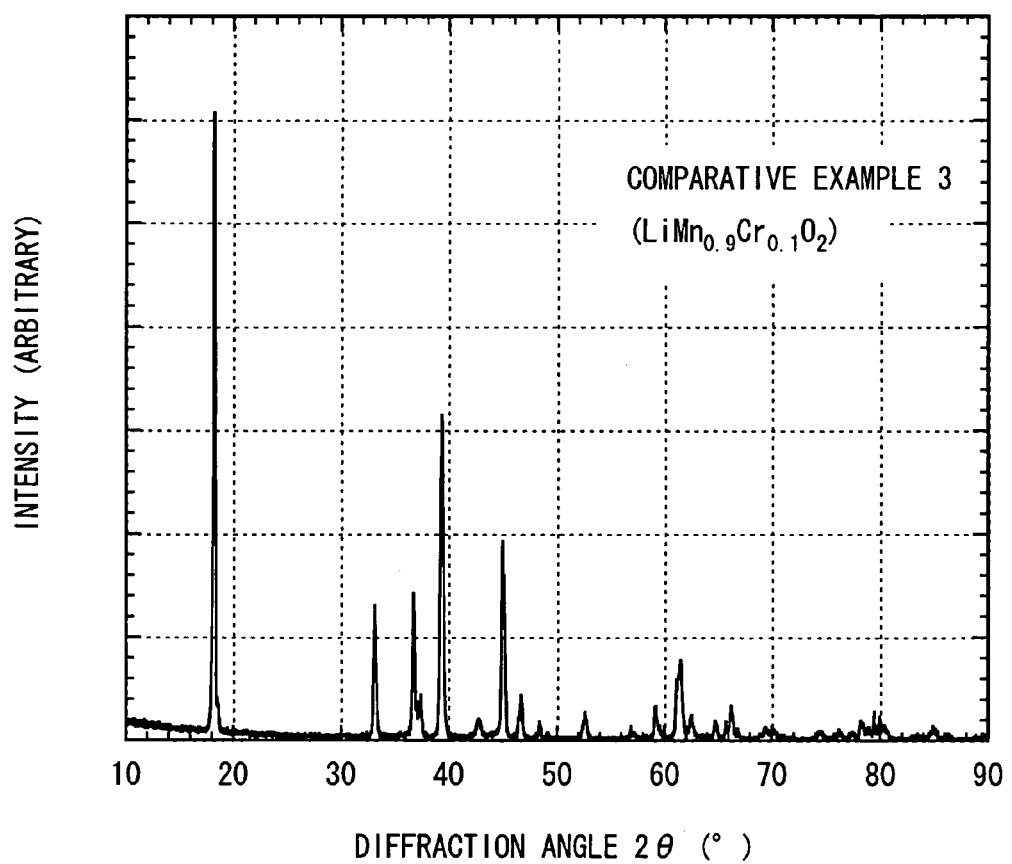
FIG. 12 is a plot showing an X-ray diffraction pattern of a cathode material in Comparative Example 3.

The powder X-ray diffraction pattern of the lithium composite oxide in Comparative Example 3 was measured as in the case of Examples 1 through 4. As a result, it was found out that the lithium composite oxide in Comparative Example 3 also had a layer structure. FIG. 12 shows the diffraction pattern in Comparative Example 3.

Figure 13:
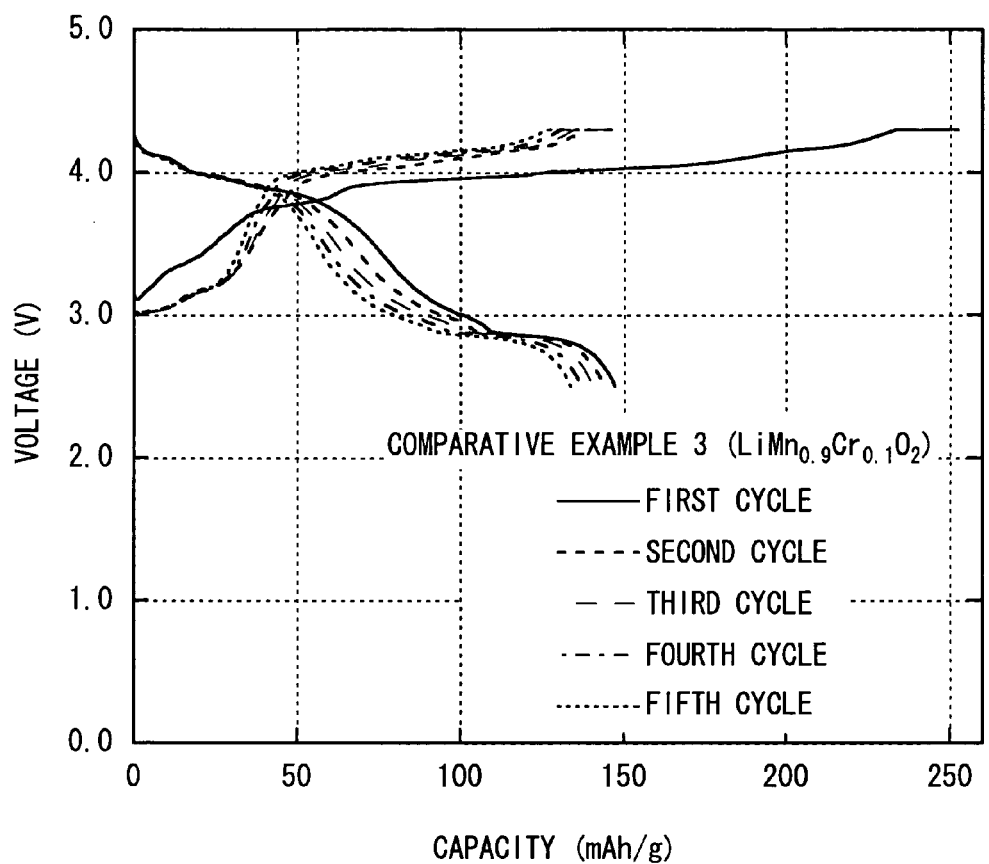
FIG. 13 is a plot showing charge-discharge curves in Comparative Example 3.

A coin type battery was made by using the lithium composite oxide in Comparative Example 3 as in the case of Examples 1 through 4, and the properties of the cathode material were evaluated in the same manner. FIG. 13 shows charge-discharge curves in Comparative Example 3. In FIG. 13, a solid line, a short dashed line, a long dashed line, an alternate long and short line and a dot-dashed line indicate the charge-discharge curves in the first cycle, the second cycle, the third cycle, the fourth cycle and the fifth cycle, respectively.

As shown in FIGS. 4 and 13, in Comparative Example 3 including chromium as the second element relative to Example 3 including aluminum as the second element, the charge capacity in the first cycle was as large as 252 mAh/g, but the discharge capacity in the first cycle was as small as 148 mAh/g. Moreover, when the charge-discharge cycle was repeated, the charge capacity and the discharge capacity were declined, and the discharge voltage became lower. In other words, it was found out that when aluminum was included as the second element, the crystalline structure could be stabilized, and even though chromium was included as the second element, such an effect could not be obtained.

Example 5

A lithium composite oxide $Li_aMI_bMII_cO_2$ having a composition shown in Table 6, more specifically $Li_{1.3}Mn_{0.5}Ni_{0.4}Al_{0.1}O_2$ was synthesized as in the case of Examples 1 through 4, except that a molar ratio of materials was changed as shown in Table 5. Example 5 had the same composition as Example 3, except that the composition of the first element was ($Mn_{5/9}Ni_{4/9}$).

Figure 14:
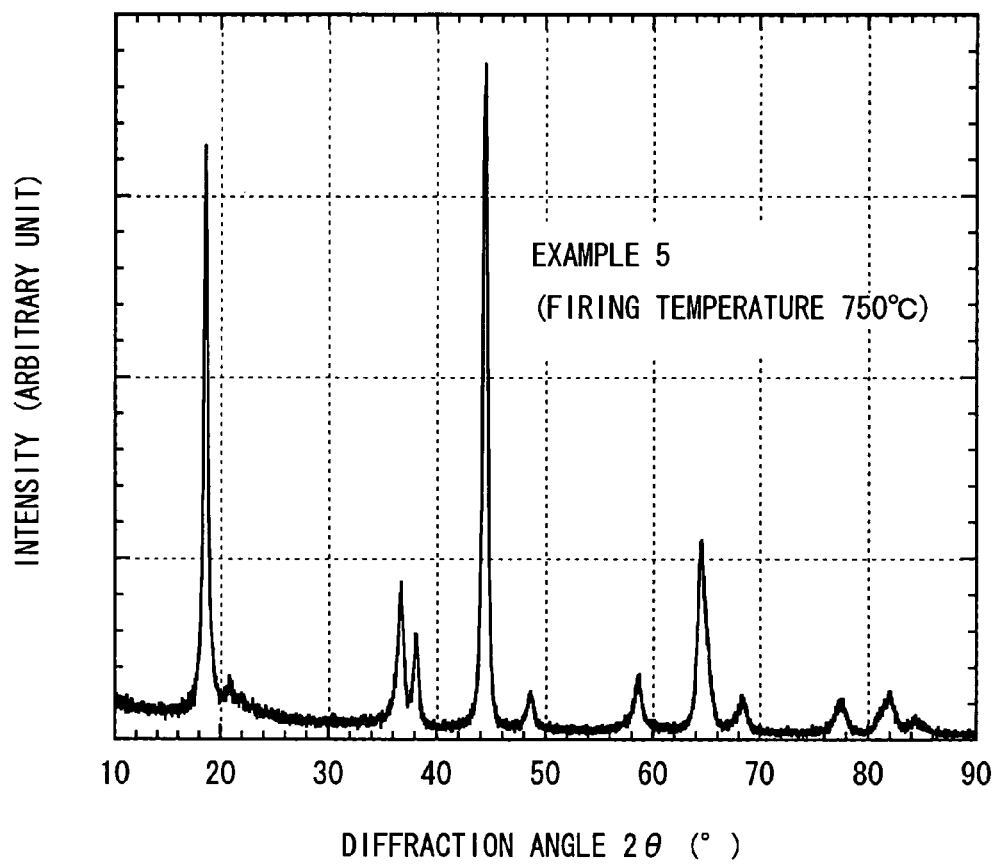
FIG. 14 is a plot showing an X-ray diffraction pattern of a cathode material in Example 5.

The powder X-ray diffraction patterns of the lithium composite oxide in Example 5 was measured as in the case of Examples 1 through 4. As a result, it was found out that the lithium composite oxide in Example 5 also had a layer structure. FIG. 14 shows the diffraction pattern in Example 5 in the case where the firing temperature was 750° C. as a representative.

Figure 15:
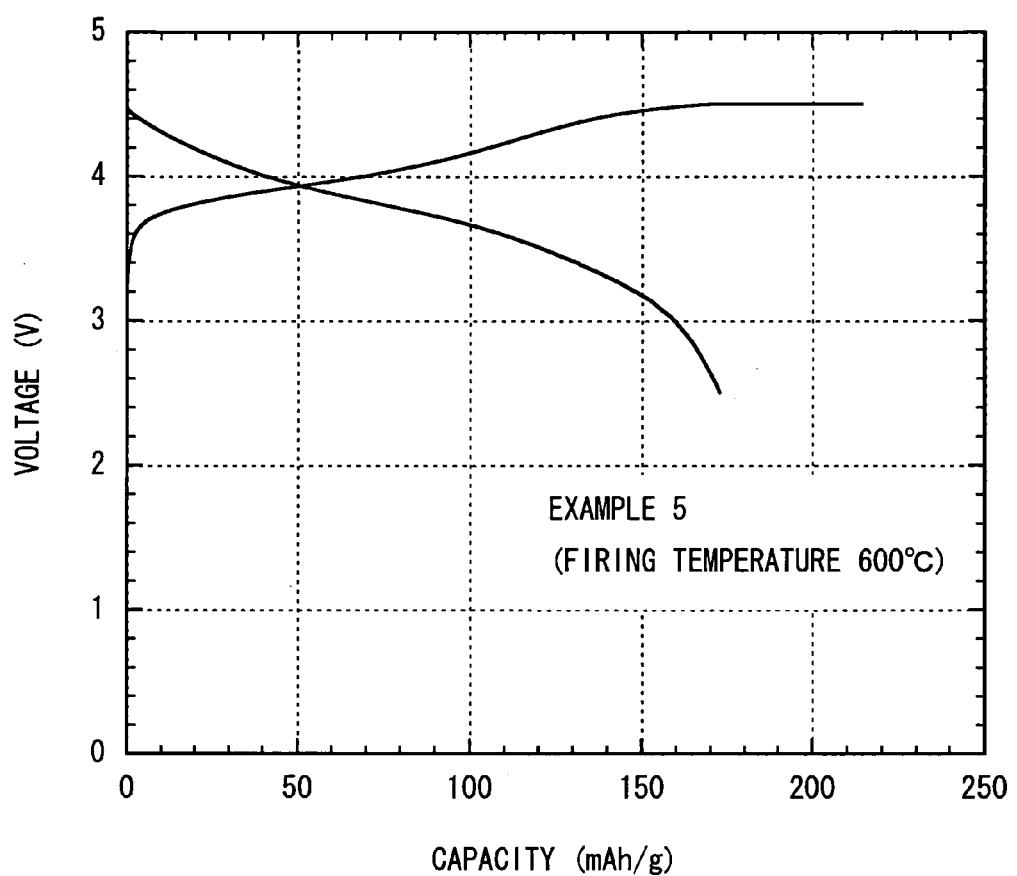
FIG. 15 is a plot showing charge-discharge curves in Example 5.

A coin type battery was made by using the lithium composite oxide in Example 5 as in the case of Examples 1 through 4, and the properties of the cathode material were evaluated in the same manner. FIG. 15 shows a charge-discharge curve in Example 5 in the case where the firing temperature was 600° C. as a representative, and Table 7 shows the charge capacity and the discharge capacity in the first cycle in that case together with the results of Example 3.

As shown in FIGS. 4 and 15 and Table 7, Example 3 including cobalt as the first element could obtain a higher charge capacity and a higher discharge capacity than Example 5 not including cobalt. In other words, it was found out that when cobalt was further included as the first element, a higher capacity could be obtained.

In the above Examples, the composition of the lithium composite oxide is described referring to specific examples, however, a lithium composite oxide with any other composition can obtain the same effects, as long as the composition is within a range described in the above embodiments.

The invention is described referring to the embodiments and Examples, but the invention is not limited to the embodiments and Examples, and is variously modified. For example, in the embodiments and Examples, the case where the lithium composite oxide includes lithium, the first element, the second element and oxygen is described, but the lithium composite oxide may further include any other element.

Moreover, in the embodiments and Examples, the case where the cathode material comprises the lithium composite oxide with the above-described composition is described. However, in addition to the lithium composite oxide, any other lithium composite oxide such as $LiCoO_2$, $LiNiO_2$, $LiMnO_2$, $LiMn_2O_4$ or the like, a lithium sulfide, a phosphate containing lithium such as $LiMn_xFe_yPO_4$, a high molecular weight material or the like may be mixed.

Further, in the embodiments and Examples, the case where the liquid electrolyte is used as the electrolyte solution is described, but any other electrolyte may be used. As the other electrolyte, for example, gel electrolyte in which a high molecular weight compound holds an electrolyte solution, an organic solid electrolyte in which electrolyte salt is dispersed in a high molecular weight compound having ionic conductivity, an inorganic solid electrolyte such as ionic conducting ceramic, ionic conducting glass, ionic crystal or the like, a mixture of the inorganic solid electrolyte and the electrolyte solution, a mixture of the inorganic solid electrolyte and the gel electrolyte, and a mixture of the inorganic solid electrolyte and the organic solid electrolyte are cited.

In addition, the embodiments and Examples are described referring to the coin type secondary battery. However, the invention is also applicable to secondary batteries with any other structure and any other shape such as a cylinder shape, a button shape, a prismatic shape or the like, or secondary batteries with any other structure such as a winding structure or the like in the same manner.

Further, in the embodiments and Examples, the case where the cathode material according to the invention is used for the secondary battery is described, however, the cathode material is applicable to any other batteries such as primary batteries.

As described above, the cathode material according to the invention comprises a lithium composite oxide including at least two kinds selected from the group consisting of manganese, nickel and cobalt as the first element, so a higher capacity, a higher potential and a higher cost efficiency can be obtained. Moreover, the lithium composite oxide includes the second element, so the crystalline structure thereof can be stabilized, and the charge-discharge cycle characteristics can be improved. Further, the composition ratio of lithium to the total of the first element and the second element (lithium/the total of the first element and the second element) in the lithium composite oxide is larger than 1 in molar ratio, so the electric capacity during charge can be improved, and a certain amount of lithium remains in the crystalline structure even after charge, so the stability of the crystalline structure can be further improved.

More specifically, the cathode material according to an aspect of the invention comprises manganese as the first element, so a higher capacity and a higher potential can be achieved at lower cost.

Moreover, in the cathode material according to another aspect of the invention, the composition of the lithium composite oxide is within a range of $1.0<a<1.5$, $0.9<b+c<1.1$, $a>b+c$, $1.8<d<2.5$ as shown in Chemical Formula 1, so the capacity can be further improved.

Further, in the battery according to the invention, the cathode material according to the invention is used, so a higher discharge capacity, a higher discharge potential, superior charge-discharge cycle characteristics and a higher cost efficiency can be obtained.

Obviously many modifications and variations of the present invention are possible in the light of the above teachings. It is therefore to be understood that within the scope of the appended claims the invention may be practiced otherwise than as specifically described.

TABLE 1

| | MOLAR RATIO | | | | |
|---|---|---|---|---|---|
| | $LiOH \cdot H_2O$ | $Mn_2O_3$ | $Ni(OH)_2$ | $Co(OH)_2$ | $Al(NO_3)_3 \cdot 9H_2O$ |
| EXAMPLE 1 | 1.1 | 0.25 | 0.2 | 0.2 | 0.1 |
| EXAMPLE 2 | 1.2 | 0.25 | 0.2 | 0.2 | 0.1 |
| EXAMPLE 3 | 1.3 | 0.25 | 0.2 | 0.2 | 0.1 |
| EXAMPLE 4 | 1.4 | 0.25 | 0.2 | 0.2 | 0.1 |
| COMPARATIVE EXAMPLE 1 | 1.0 | 0.25 | 0.2 | 0.2 | 0.1 |
| COMPARATIVE EXAMPLE 2 | 1.0 | 0 | 0.8 | 0.2 | 0 |

TABLE 2

| | $Li_aMI_bMII_cO_2$ | | | | |
|---|---|---|---|---|---|
| | FIRST ELEMENT MI | SECOND ELEMENT MII | a | b | c |
| EXAMPLE 1 | $(Mn_{5/9}Ni_{2/9}Co_{2/9})$ | Al | 1.1 | 0.9 | 0.1 |
| EXAMPLE 2 | $(Mn_{5/9}Ni_{2/9}Co_{2/9})$ | Al | 1.2 | 0.9 | 0.1 |
| EXAMPLE 3 | $(Mn_{5/9}Ni_{2/9}Co_{2/9})$ | Al | 1.3 | 0.9 | 0.1 |
| EXAMPLE 4 | $(Mn_{5/9}Ni_{2/9}Co_{2/9})$ | Al | 1.4 | 0.9 | 0.1 |
| COMPARATIVE EXAMPLE 1 | $(Mn_{5/9}Ni_{2/9}Co_{2/9})$ | Al | 1.0 | 0.9 | 0.1 |
| COMPARATIVE EXAMPLE 2 | $(Ni_{4/5}Co_{1/5})$ | — | 1.0 | 1.0 | 0 |

TABLE 3

| | CHARGE CAPACITY (mAh/g) | DISCHARGE CAPACITY (mAh/g) |
|---|---|---|
| EXAMPLE 3 | 250 | 203 |
| COMPARATIVE EXAMPLE 1 | 178 | 158 |
| COMPARATIVE EXAMPLE 2 | 203 | 178 |

TABLE 4

| | MOLAR RATIO | | |
|---|---|---|---|
| | $LiOH \cdot H_2O$ | $Mn_2O_3$ | $Cr(NO_3)_3 \cdot 9H_2O$ |
| COMPARATIVE EXAMPLE 3 | 1.0 | 0.45 | 0.1 |

TABLE 5

| | MOLAR RATIO | | | | |
|---|---|---|---|---|---|
| | $LiOH \cdot H_2O$ | $Mn_2O_3$ | $Ni(OH)_2$ | $Co(OH)_2$ | $Al(NO_3)_3 \cdot 9H_2O$ |
| EXAMPLE 5 | 1.3 | 0.25 | 0.4 | 0 | 0.1 |

TABLE 6

| | $Li_aMI_bMII_cO_2$ | | | | |
|---|---|---|---|---|---|
| | FIRST ELEMENT MI | SECOND ELEMENT MII | a | b | c |
| EXAMPLE 5 | $(Mn_{5/9}Ni_{4/9})$ | Al | 1.3 | 0.9 | 0.1 |

TABLE 7

| | CHARGE CAPACITY (mAh/g) | DISCHARGE CAPACITY (mAh/g) |
|---|---|---|
| EXAMPLE 3 | 250 | 203 |
| EXAMPLE 5 | 215 | 175 |

The invention claimed is:

1. A cathode active material, comprising:
a lithium composite oxide,
wherein,
the lithium composite oxide is $Li_aMn_{5/9}Ni_{2/9}Co_{2/9}Al_{0.1}O_2$ and a is $1.3 \leq a \leq 1.4$.

2. The cathode active material of claim 1, wherein a=1.3.

3. The cathode active material of claim 2, wherein a battery having the cathode active material has a charge capacity of 250 mAh/g and a discharge capacity of 203 mAh/g after a charge/discharge cycle,
wherein the charge/discharge cycle has a constant current charge performed on the battery until a battery voltage of the battery reaches 4.5V at a constant charge current and then a constant voltage charge performed on the battery until a battery current of the battery becomes 0.05 mA/cm$^2$ or less at a constant voltage of 4.5V, and then a constant current discharge performed on the battery until the battery voltage reaches 2.5V at a constant discharge current.

4. A battery, comprising:
a cathode;
an anode; and
an electrolyte,
wherein the cathode comprises a cathode active material including a lithium composite oxide, and the lithium composite oxide is $Li_aMn_{5/9}Ni_{2/9}Co_{2/9}Al_{0.1}O_2$ and a is $1.3 \leq a \leq 1.4$.

5. The battery of claim 4, wherein a=1.3.

* * * * *